UNITED STATES PATENT OFFICE.

THOMAS J. MAYALL, OF BOSTON, MASSACHUSETTS.

IMPROVEMENT IN THE MANUFACTURE OF VULCANIZED INDIA-RUBBER ROLLS.

Specification forming part of Letters Patent No. 125,595, dated April 9, 1872.

*To whom it may concern:*

Be it known that I, THOMAS J. MAYALL, of Boston, Suffolk county, Massachusetts, have invented certain new and useful Improvements in the Manufacture of Vulcanized India-Rubber Rolls, of which the following is a specification:

My invention relates to India-rubber rolls for use in wringing and washing machines and in other machinery, and it has special reference to the mode of making or building up the body of the roll upon its metallic axis or shaft for the purpose of obtaining a durable roll, and one which is permanently and firmly united with its shaft and not liable to be detached therefrom by the twisting strains to which such rolls are usually subjected.

To make the roll I proceed as follows: That portion of the metallic shaft upon which the rubber roll is to be built is indented or provided with corrugations or holes, or is otherwise formed with an uneven surface, to allow the rubber to take a firm hold on it. I prefer to indent the shaft, using a trip-hammer with a chisel end, arranged to form indentations lengthwise of the shaft. To prevent the shaft from being bent or crooked under the action of the hammer, I place under it a bed of lead, on which it rests during the indenting operation. I next thoroughly coat that part of the shaft upon which the roll is to be formed with a solution composed of India rubber or gutta-percha, sulphur, and camphene, naphtha, or other solvent of rubber, in about the following proportions: unvulcanized India rubber or gutta-percha, eight pounds; sulphur, four pounds; naphtha or other solvent, four to six gallons. The proportion of sulphur may be increased, and, in practice, I prefer to use in this solution as much sulphur as practicable, for the reason that a better union of the roll with the shaft is thereby secured. Upon this liquid coating, which has the constituent parts of hard rubber, I apply a layer of unvulcanized hard rubber compound in sheet form, which is wrapped closely around the shaft to a thickness of, say, from one-sixteenth to one-eighth of an inch. Upon this unvulcanized hard rubber layer I apply a layer of unvulcanized soft rubber compound, made of India rubber, pulverized barytes, and sulphur, in about the following proportions: rubber, eight pounds; barytes, six to ten pounds; sulphur, three-quarters of a pound. This layer is applied in sheet form and wrapped closely around the hard rubber to a thickness of from one-sixteenth to one-eighth of an inch. Upon this soft rubber layer I build up the body of the roll with any of the known vulcanizable soft rubber compounds, and in the usual way. The roll may then be vulcanized and finished in any ordinary or suitable manner.

I prefer, however, to do this as follows: The process is described as that which would be followed in vulcanizing a wringer-roll of the usual size. To vulcanize larger and thicker rolls, the time required for the different heats would, of course, need to be increased. The roll is first wrapped in a cloth or put into a mold, as well understood by manufacturers of rubber rolls. A number of these rolls thus wrapped or in molds are placed in a water-tight tank containing water enough to cover the rolls some six or eight inches. The tank is then run into the ordinary steam-heater used for vulcanizing, and the heat is maintained at 232° Fahrenheit for about one hour. It is then increased to 250° for from half an hour to one hour; then increased to 270° for about one hour; and then it is raised to 295° for about an hour. After this last heating the vulcanization will be effected and all parts of the roll, including both the hard and the soft rubber, will be thoroughly cured.

The solution of hard rubber compound next to the shaft tightly unites the hard-rubber sheet layer with the shaft and prevents it from stripping off therefrom. The soft-rubber compound next to the hard rubber, owing to the barytes which it contains, is closely and intimately united with the hard rubber, and will not separate therefrom; while any of the soft-rubber compound may be built upon and will unite with the barytes soft-rubber compound. A roll is thus produced in which all the parts are solidly united with one another and with the shaft upon which they are built.

I have stated in the foregoing specification the proportions which I prefer to use in making the roll; but I do not confine myself strictly to those proportions, as the same may be varied, to some extent, without departure from my invention.

What I claim, and desire to secure by Letters Patent, is—

1. The manufacture of vulcanized India-rubber rolls, substantially in the manner herein described.

2. As a new manufacture, a vulcanized India-rubber roll, made substantially as described.

In testimony whereof I have signed my name to this specification in the presence of two subscribing witnesses.

THOS. J. MAYALL.

Witnesses:
   EDM. F. BROWN,
   W. BAILEY.